Feb. 17, 1942.   D. C. BAILEY   2,273,684
WEATHER STRIP
Original Filed Jan. 18, 1939
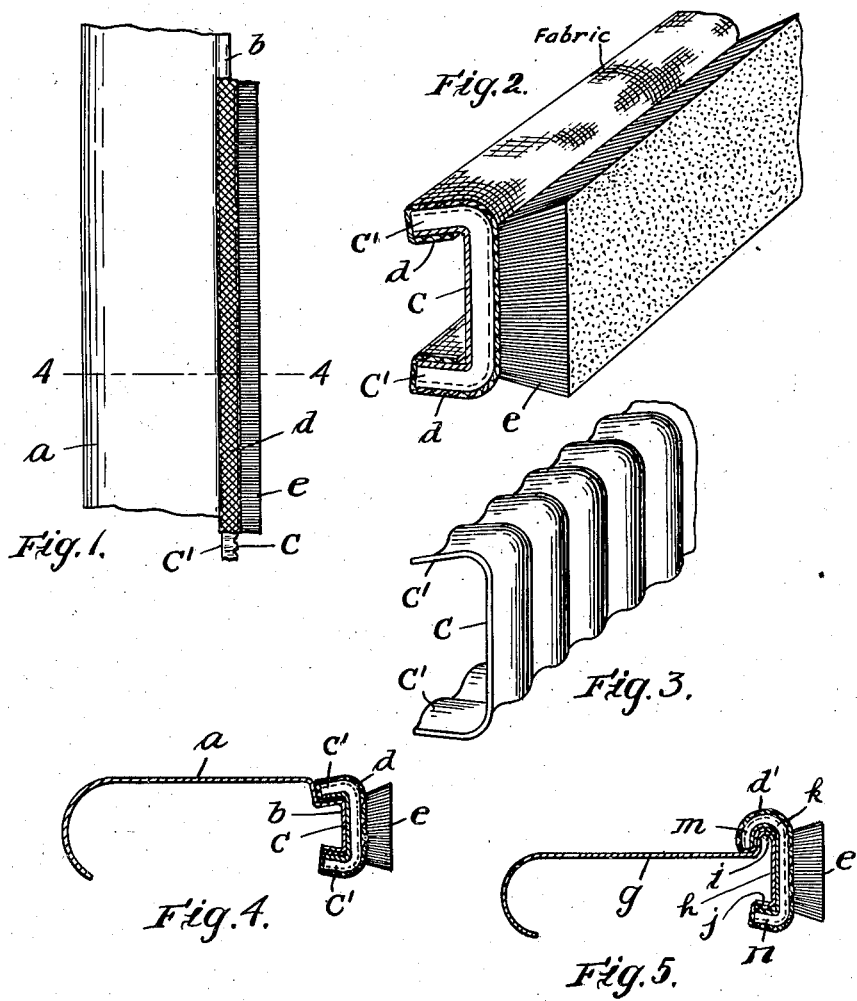
Inventor.
David C. Bailey Patented Feb. 17, 1942

2,273,684

UNITED STATES PATENT OFFICE 2,273,684

WEATHER STRIP

David C. Bailey, Amesbury, Mass.

Original application January 18, 1939, Serial No. 251,544, now Patent No. 2,197,332, dated April 16, 1940. Divided and this application November 9, 1939, Serial No. 303,649

6 Claims. (Cl. 20—69)

This invention relates to certain improvements in weather strips, or window glass guiding and cushioning means, which are primarily intended for use in the construction of automobile bodies, and is a division of my application filed January 18, 1939, Serial No. 251,544.

Prior to my invention weather or draft strips have usually been attached to the body by means of staples, or small fasteners, and such fastening means have been found to be objectionable, as they frequently permitted water to enter the interior of the body, thereby causing damage to the upholstery and trim.

The primary object of my invention is to provide a construction of garnish molding, or other body part, and a weather strip, which will not require the use of staples, or other supplemental fastening means to secure the strip in position, and which will provide a water or weather tight connection between the strip and body part. Also to provide a construction which will permit the strip to be quickly attached, and, when attached, will securely hold the strip in position, so that all possibility that the strip will become displaced in use will be avoided.

A further object is to provide a form of cushion carrying strip which may be produced at low manufacturing cost.

I accomplish these objects by providing the molding, or other part to which the strip is to be attached, with a projecting rib, which is designed to receive a cushion holding weather strip having a core correspondingly constructed of thin, transversely corrugated sheet metal, adapted to be bent in any direction to conform to the shape of the rib and to be interengaged therewith by pressing the strip onto the rib, so that the strip will be securely attached to the rib and an air and water tight joint will be provided therebetween.

For a more complete disclosure of the specific construction which I employ, reference is made to the following specification, in connection with the accompanying drawing in which:

Fig. 1 is a side elevation of a section of a garnish molding containing an embodiment of my invention.

Fig. 2 is a combined sectional and perspective view of one form of weather strip which I may employ.

Fig. 3 is a detail perspective view of the weather strip core employed in the strip disclosed in Fig. 2.

Fig. 4 is a sectional view at line 4—4 of Fig. 1.

Fig. 5 is a similar view illustrating a modification.

In the drawing a section of a garnish molding $a$ is indicated which is formed of sheet metal by means of dies and according to one form of my invention, when the molding, or other part is formed, a rib $b$ is formed thereon, which is located in the surface portion which is to be engaged by the window glass, or to which the weather strip is to be applied. Said rib is of dovetail formation, as its sides are slightly inclined inward from the top of the rib, as shown in Fig. 4.

I further provide a weather strip which comprises a core consisting of a strip of thin, corrugated, slightly resilient sheet metal, the corrugations in which extend transversely from edge to edge of the strip, as shown on a greatly enlarged scale in Fig. 3, and are arranged closely together as shown, said strip being bent transversely in channel form, providing a longitudinal middle portion $c$ and two side portions $c'$, of equal width, the width of said middle portion and said side portions internally corresponding to the width of the top portion of the rib $b$ and to the height of its sides, respectively. The sides of the core also extend at a slight convergence from the middle portion, as shown in Figs. 2 and 3.

Said core is covered with a textile fabric $d$, which is adhesively connected thereto and extends transversely from within the sides of the core about the outer sides and middle thereof. The middle portion of the fabric is provided with a cushioning pile $e$, which is interwoven therein, or is otherwise secured thereto, and which extends for the length of the core and the width of its top portion, as shown in Fig. 2.

The weather strip, as thus constructed, is forced onto the rib $b$, as shown in Figs. 1 and 4, the sides of the core $c$ being sprung apart slightly by this operation, so that when the middle portion of the core is pressed against the top of the rib, the sides of the core will spring towards each other and firmly engage the sides of the rib, and, as the sides of the latter are slightly inclined inward, the weather strip will become securely connected to the body part, as shown in Fig. 4, and a water tight joint will be provided. It will be understood that if a window glass is to be cushioned, the glass will be located between the cushioning pile on two adjacently disposed moldings. Also that if the molding and the rib which is formed thereon, is of curved formation, the strip may be readily bent in any direction correspondingly.

In Fig. 5 a slightly modified form of attaching rib for the body member is illustrated together with a correspondingly modified form of core for the weather strip.

In this form the body $g$ is formed to provide a rib $h$ having a transversely projecting portion $i$ at one side and an inwardly inclined side portion $j$ at the opposite side. In this instance the core $k$ is correspondingly shaped, having one side $m$ of hook formation and the other side $n$ formed to provide an inwardly inclined edge portion, otherwise the construction is similar to that already described, the covering $d'$ which carries the cushioning strip $e$ extending over the outer side of the core onto the inner sides of its portions $m$ and $n$.

In applying the weather strip, the side $m$ is hooked onto projection $i$ and then the strip is pressed inward, so that the side $n$ engages the side $j$ of the rib.

Consequently, when the middle portion of the core is pressed against the top of the rib, the core and rib will be interlocked, so that the weather strip will be securely attached to the molding, and an air and water tight joint will be provided.

As the metal of which the core of the strip is formed is slightly resilient, when the strip is pushed on to the rib, in either of the forms above described, one or both sides of the core will yield slightly, and when the strip has been pushed on to its fullest extent, so that the middle portion of the core bears against the top of the rib, the side portion or portions will spring back to their original form and thus firmly grip the sides of the rib.

I have also ascertained by experiment that the frictional engagement of the corrugated core with the rib is much greater than it would be if the metal of the core were not corrugated, so that the fact that the core is corrugated aids materially in providing a secure attachment of the strip to the body member, and at the same time permits bending in any direction to conform to the shape of the rib.

I claim:

1. In combination with a body member having an elongated rib on the face side thereof, a weather strip having a U-form core of transversely corrugated sheet metal adapted to be bent in any direction and surrounding and fitting about said rib and frictionally engaged therewith, and cushioning means on the outer side of the middle portion of said core.

2. In combination with a body member having an elongated rib on the face side thereof, a weather strip having a U-form core of transversely corrugated sheet metal fitted about said rib and in pressure engagement with the outer side walls thereof by the inherent resiliency of the core, a fabric covering on said core, and cushioning means on said covering arranged on the outer side of the middle portion of said core.

3. In combination with a body member having an elongated rib projecting therefrom, said rib having one side inclined inward from its top, a weather strip having a generally U-shaped core of transversely corrugated sheet metal adapted to be bent in any direction and shaped to conform to the transverse formation of said rib and fitting over and about the outer side walls of the rib, and cushioning means on the middle portion of the outer side of said core.

4. In combination with a body member having an elongated rib projecting therefrom, said rib having its sides inclined inward from its top, a weather strip having a U-form core of transversely corrugated sheet metal, the sides of said core extending convergently from its bottom and being fitted onto said rib and frictionally engaged therewith, and cushioning means on the outer side of the middle portion of said core.

5. In combination with a body member having an elongated rib projecting therefrom, said rib having its sides inclined inward from its top, a weather strip having a U-form core of transversely corrugated sheet metal having convergently disposed sides conforming internally to the exterior of said rib, said core having a fabric covering extending from the inner sides thereof over the outer side and middle portion thereof and cushioning means connected to said covering and located on the outer side of the middle portion of the core.

6. In combination with a body member having an elongated rib projecting therefrom, said rib having one side transversely convex and the opposite side inclined inward from its top, a weather strip fitted over said rib and having a transversely corrugated core of thin sheet metal shaped correspondingly to said rib, said core having a fabric covering and cushioning material on its middle portion.

DAVID C. BAILEY.